United States Patent [19]

Cherdak et al.

[11] Patent Number: 5,635,682
[45] Date of Patent: Jun. 3, 1997

[54] WIRELESS STYLUS AND DISPOSABLE STYLUS CARTRIDGE THEREFOR FOR USE WITH A PEN COMPUTING DEVICE

[75] Inventors: Erik B. Cherdak, Montgomery County, Md.; Carl Caslowitz, Merrimack County, N.H.

[73] Assignee: A.T. Cross Company, Lincoln, R.I.

[21] Appl. No.: 214,166

[22] Filed: Mar. 16, 1994

[51] Int. Cl.⁶ .................................................. G08C 21/00
[52] U.S. Cl. ........................................... 178/18; 345/179
[58] Field of Search ............................... 178/18, 19, 20; 345/179, 180, 181; 352/3, 13

[56] References Cited

U.S. PATENT DOCUMENTS

| | | | |
|---|---|---|---|
| 4,695,680 | 9/1987 | Kable | 178/19 |
| 4,697,050 | 9/1987 | Farel | 178/19 X |
| 5,297,137 | 3/1994 | Epperson | 178/18 |
| 5,440,080 | 8/1995 | Nagaoka et al. | 178/18 |

*Primary Examiner*—Curtis Kuntz
*Assistant Examiner*—Paul Loomis
*Attorney, Agent, or Firm*—Colucci & Umans

[57] ABSTRACT

A wireless stylus apparatus for use with a pen computing device having a input screen or tablet for inputting information into the pen computing device. The wireless stylus includes, but is not limited to, a reusable barrel having an open end and a disposable stylus cartridge having a body section and a head section. The head section has a point. The information is input to the pen computing device when the point is in contact with the surface of the input screen or tablet. The disposable stylus cartridge is meant to be releasably mounted in the reusable barrel so that the head section can extend beyond the open end thereof. The disposable stylus cartridge is configured to leave no discernable mark on the input screen or tablet when the head section of the disposable stylus cartridge is in contact with the input screen or tablet. Additionally, A disposable stylus cartridge adapted to replace a refill cartridge used with a typical reusable writing device is disclosed. The reusable writing device has a barrel which includes an open end. The disposable stylus cartridge is configured to input information into a pen computing device which includes an input screen. The disposable stylus cartridge includes, but is not limited to a body section and a head section integrally formed with the body section. The head section has a point. Information is input to the pen computing device when the point is placed into contact with the input screen of the pen computing device. The disposable stylus cartridge is configured to be releasably mounted in the reusable barrel so that the head section of the disposable stylus cartridge can extend beyond the open end of the barrel. The disposable stylus cartridge is configured to leave no discernable mark on the input screen when the point of the head section of the disposable stylus cartridge is in contact therewith. Finally, the disposable stylus cartridge being configured to wear with use.

18 Claims, 1 Drawing Sheet

FIG. 1B
PRIOR ART
FIG. 1A
PRIOR ART
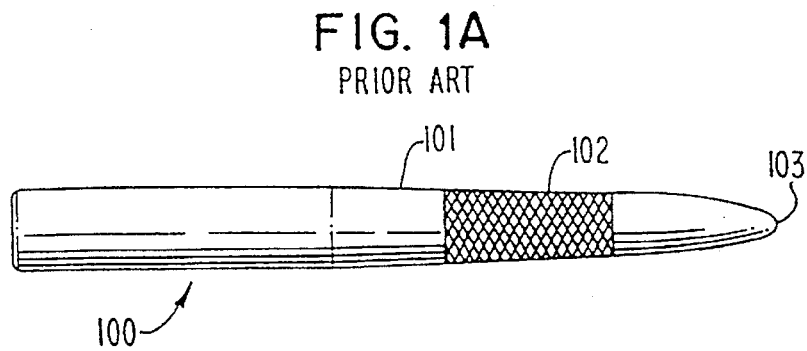
FIG. 2B
FIG. 2A
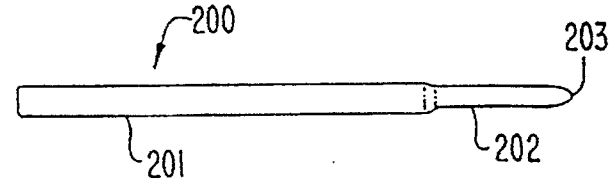
FIG. 3
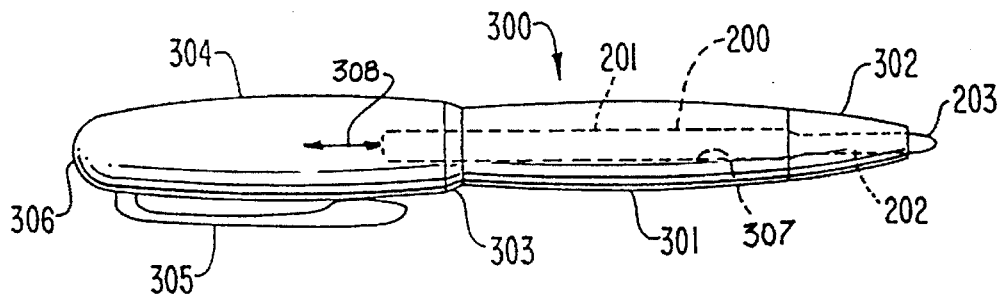
FIG. 4
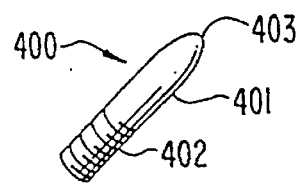

WIRELESS STYLUS AND DISPOSABLE STYLUS CARTRIDGE THEREFOR FOR USE WITH A PEN COMPUTING DEVICE

BACKGROUND OF THE INVENTION

1. Field of the Invention

The present invention relates to wireless styluses used to input information into pen computing devices.

2. Description of the Related Art

Typical wireless stylus structures (i.e., styluses which are not configured to provide electrical signals from circuitry disposed with in the styluses and which are not tethered to a pen computing device by some electrical means) (hereinafter "styluses") used to input information into pen computing devices have been manufactured by CASIO, SHARP ELECTRONICS, RADIO SHACK (i.e., ZOOMER), AT&T (i.e., EO) and APPLE COMPUTER CORP. (i.e., NEWTON). Typically, stylus structures comprise one-part or multi-part constructions of plastic which have unique shapes and sizes adapted to be held in a user's hand. In fact, many styluses are made from plastic in sizes which are configured to fit into and to be stored in dedicated recepticals formed in the cases of the pen computing devices with which such styluses are designed to operate (e.g., RADIO SHACK's Model ZOOMER PERSONAL DIGITAL ASSISTANT Model No. Z-PDA).

The SHARP ELECTRONICS Model EXPERT PAD PERSONAL DIGITAL ASSISTANT Model No. PI-7000 has software which converts handwritten characters into machine processable text and handwritten graphics into diagrams and geometric forms. The SHARP EXPERT PAD comprises a touch screen which allows a wireless stylus to come into frictional contact therewith to allow a user to input information into his or her pen computing device in the form of handwritten images. The converted text and images are graphically viewed on the EXPERT PAD's touch screen (e.g., liquid crystal screen "LCD") in a contrasting fashion. The SHARP EXPERT PAD, like the other pen computing devices mentioned above, incorporates a case structure wherein its dedicated, plastic, multi-part wireless stylus is stored when not in use.

A typical stylus is depicted in FIGS. 1A and 1B. Stylus 100 includes a body section 101, a griping section 102, and a tip 103. Tip 103 is conical in shape, but blunt enough so that damage does not occur to the screen of a pen computing device when stylus 100 is placed into frictional contact with that screen. The required bluntness of tip 103 is well known in the art of stylus structures. Typically, stylus 100 would be made of plastic or other suitable materials the characteristics of which are such that no damage occurs to a touch-screen or tablet of a pen computing device.

FIG. 1B illustrates a rear elevational view of stylus 100 and indicates the fact that the width of stylus 100 is large enough to allow stylus 100 to be comfortably held in a user's hand. However, FIG. 1B also illustrates that stylus 100 is too large to be used as a cartridge for a pre-existing writing implement which is adapted to take refill cartridges. As such, the present state of styluses has not heretofore envisioned the use of a stylus cartridge which may be used with pre-existing writing implements (e.g., reusable pens and pencils).

There are many other disadvantages associated with the styluses mentioned above. For example, such styluses are often ugly in relation to a user's other writing implements (e.g., his or her stylus may not match a carefully arranged set of writing implements such as matching sets of reusable pens and pencils).

Moreover, the styluses of the prior art are often difficult to replace when lost, thereby causing a user of a pen computing to use an unintended devices such as a ball-point pen, a sharp pencil, a fountain pen, a fingernail or a bent paper clip to input information into his or her pen computing device. Such, unintended devices can cause irreparable harm or damage to the surface of the screen of a user's pen computing device thereby causing a repair or replacement to be necessary or a malfunction to occur.

The above-mentioned and other problems are solved by the present invention.

SUMMARY OF THE INVENTION

Having described some disadvantages of styluses of the prior art, it is therefore an object of the present invention to solve such problems.

It is yet another object of the present invention to provide a stylus adapted to take a disposable stylus cartridge.

It is yet a further object of the present invention to provide a disposable stylus cartridge which has the same physical dimensions as that of a disposable ink cartridge used in reusable writing implements.

It is still a further object of the present invention to provide a disposable stylus cartridge adapted to be inserted into a reusable, fine or fancy writing device which does not damage a screen of a pen computing device when a tip of the disposable stylus cartridge comes into frictional contact with the screen.

It is still another object of the present invention to provide a disposable stylus cartridge which is easy and cost effective to manufacture and which does not require re-tooling of existing mechanical writing implements.

These and other objects and advantages of the present invention are achieved by providing a wireless stylus apparatus for use with a pen computing device having a input screen or tablet for inputting information into the pen computing device. The wireless stylus includes, but is not limited to, a reusable barrel having an open end and a disposable stylus cartridge having a body section and a head section. The head section has a point. The information is input to the pen computing device when the point is in contact with the surface of the input screen or tablet. The disposable stylus cartridge is meant to be releasably mounted in the reusable barrel so that the head section can extend beyond the open end thereof. The disposable stylus cartridge is configured to leave no discernable mark on the input screen or tablet when the head section of the disposable stylus cartridge is in contact with the input screen or tablet.

The present invention also provides a disposable stylus cartridge adapted to replace a refill cartridge used with a typical reusable writing device is disclosed. The reusable writing device has a barrel which includes an open end. The disposable stylus cartridge is configured to input information into a pen computing device which includes an input screen. The disposable stylus cartridge includes, but is not limited to a body section and a head section integrally formed with the body section. The head section has a point. Information is input to the pen computing device when the point is placed into contact with the input screen of the pen computing device. The disposable stylus cartridge is configured to be releasably mounted in the reusable barrel so that the head section of the disposable stylus cartridge can extend beyond the open end of the barrel. The disposable stylus cartridge is configured to leave no discernable mark on the input screen when the point of the head section of the disposable stylus cartridge is in contact therewith. Finally, the disposable stylus cartridge being configured to wear with use.

BRIEF DESCRIPTION OF THE DRAWINGS

The above-mentioned objects and advantages of the present invention will become apparent from the following description taken in connection with the accompanying drawings of which:

FIG. 1A depicts a view of a stylus for use with a pen computing device according to the prior art and which was discussed above.

FIG. 1B depicts a rear elevational view of the stylus depicted in FIG. 1 A.

FIG. 2A depicts a view of a disposable stylus cartridge for use with a writing implement adapted to utilize disposable writing cartridges according to the present invention.

FIG. 2B depicts a rear elevational view of the disposable stylus cartridge depicted in FIG. 1A.

FIG. 3 depicts a view of a writing implement incorporating a disposable stylus cartridge according to the present invention.

FIG. 4 depicts an alternative embodiment of a disposable stylus cartridge according to the present invention.

DESCRIPTION OF THE PREFERRED EMBODIMENTS

The following detailed description will make reference to the drawing figures which were briefly described above. Like reference numerals will be used through out the drawings to refer to like parts.

Referring now to FIGS. 2A–2B, therein depicted is a disposable stylus cartridge for use with a writing implement such as a fine writing instrument like those manufactured by MONT BLANC, WATERMAN and PARKER and which are adapted to take cartridges according to the principles of the present invention. The term "fine writing instrument" is meant to include a pen or pencil structure which is not intended to be disposable and which is designed to accept refill cartridges (usually, such fine writing instruments can cost on the order of tens or even hundreds of dollars—i.e., the MONT BLANC MEISTERSTUCK line of writing devices). Disposable stylus cartridge 200 includes a large diameter body portion 201, a small diameter head section 202, and a tip 203. Disposable stylus cartridge 200 is preferably formed using a suitable material such as plastic through use of well known injection molding techniques. Preferably, disposable stylus cartridge 200 is to be formed to have a one-part construction (i.e., not including multiple parts like existing refill cartridges which carry ink and the like) While plastic is envisioned as the preferable substance from which to form disposable stylus cartridge 200, the present invention is not so limited. In fact, other substances such as, but not limited to, wood or hard rubbers may be used. In terms of a substance from which to form disposable stylus cartridge 200, it is required that the substance be of such a nature that no damage results to a screen or tablet of a pen computing device when tip 203 comes into frictional contact with such a screen or tablet. Moreover, it should understood that the material from which disposable stylus cartridge 200 is to be formed should be of such a nature that the hardness of such material will not damage a pen computing device (e.g., the hardness of the material from which disposable stylus cartridge is formed should preferably be softer than that of the screen or tablet of a pen computing device with which disposable stylus cartridge 200 is to be used, but may be of equal hardness so that disposable stylus cartridge 200 wears sooner thereby requiring replacement that much sooner). Additionally, the material from which disposable stylus cartridge is formed should be such that tip 203 does not leave a discernable mark (i.e., an ink marking, a pencil marking, a residue like an eraser marking or a scratch) on a screen or tablet of a pen computing device (not shown) when tip 203 comes into frictional or operative contact with the screen or tablet of the pen computing device.

Disposable stylus cartridge 200 is in a form having the shape, size and appearance of a typical disposable ink cartridge which is used with a ball point pen having a reusable barrel structure. However, disposable stylus cartridge 200 is of a single-part construction and has no moving or residue leaving member (e.g., inks or pencil-based residues) and is constructed to leave no mark when placed into use with a pen computing device. For example, disposable stylus cartridge 200 can take the exact shape and dimensions of a disposable ink cartridge manufactured by the FISHER PEN COMPANY of Bolder City, N.Y., Model No. PR4 (J51.1). That is, as depicted in FIG. 2B, disposable stylus cartridge 200 has the proper shape and dimensions so that it fits fit into and operationally works with a reusable barrel structure of a usable writing implement (i.e., disposable stylus cartridge 200 has a round cylindrical body which has a diameter small enough to fit in a barrel of a reusable and refillable write sent instrument—e.g., on the order of approximately less than one half of a centimeter but the invention is not so limited and this dimension is merely stated as an exemplary dimension—other pen companies produce refill cartridges of differing dimensions). Moreover, disposable stylus cartridge 200 has the shape and construction that will permit it to work with a reusable writing device's refill cartridge extension and retraction system.

It is important to note that as disposable stylus cartridge 200 is formed from a material, which by its very nature will wear over time, and due to the fact that disposable stylus cartridge 200 is formed in the shape of a stylus to be placed into frictional contact with a surface of a pen computing device, disposable stylus cartridge 200 is, by design, disposable due to wear. When disposable stylus cartridge 200 is new and initially placed into operation, disposable stylus cartridge 200 has a particular sharpness or bluntness to its tip 203. Such sharpness or bluntness is a matter of design choice, but should be such that disposable stylus cartridge 200 is able to effectively and accurately enter information into a pen computing device via a frictional contact with a screen or tablet of such a pen computing device. The particular shape and/or bluntness of tip 203 will be apparent to those skilled in the art of wireless styluses.

As a matter of time and use, tip 203 of disposable stylus cartridge 200 will eventually wear to the point where accurate and effective inputting of information will not be possible. When the input of information results in errors or less than satisfactory performance (e.g., malfunctioning of a pen computing device), disposable stylus cartridge 200 should be removed from a reusable barrel structure (as discussed with regard to FIG. 3 below), disposed and replaced with a new disposable stylus cartridge 200. This arrangement will allow pen and stylus manufacturers to realize greater revenue streams.

In operation, disposable stylus cartridge 200 is placed into a reusable barrel structure of a reusable writing implement as is done with other pen refill cartridges. As will be seen below with regard to FIG. 3, tip 203 is meant to extend beyond the end of a reusable structure of a reusable writing implement to be placed into operative and frictional contact with a screen of a pen computing device such as those manufactured by APPLE (i.e., NEWTON) and AT&T (i.e., EO).

Referring now to FIG. 3, therein depicted is an exemplary writing instrument barrel or stylus for use with a pen computing device which in a conventional manner. The stylus is adapted to take disposable cartridges according to the principles of the present invention.

The writing instrument 300 has a hollow chamber 307 adapted to receive and secure a usual refill cartridge. This chamber is the same as is needed to receive and secure the similarly shaped stylus cartridge 200. For example, the large diameter body portion 201 of stylus cartridge 200 forms a male member which is releasably fitted into the hollow chamber 307 that forms a female member for receiving the male member. As will be explained in connection with FIG. 4, securing means may also be in a form of a rib section or thread 402 which is fitted into corresponding impressions formed in the hollow chamber 307, in particular in the end section 302. The known refill cartridge is presumed to be a conventional refill writing cartridge having a known shape and size. The passive, non-writing stylus cartridge 200 of the present invention also has the same shape and size as the refill writing cartridge so that the stylus cartridge of the invention can fit and function within the hollow chamber 307 of the barrel of the writing instrument 300.

Stylus 300 includes a lower barrel member 301, an end section 302 (e.g., a metallic end section), a decorative joining member 303, an upper barrel member 304, a shirt clip 305 and a top member 306. Shown in FIG. 3 in phantom lines is a disposable stylus cartridge 200 having body member 201, head section 202 and tip 203 as described above in regard to FIGS. 2A and 2B. The barrel arrangement of stylus 300, in actuality, may be a typical reusable writing instrument, e.g. a ball point pen or pencil device, such as those manufactured by such companies as PARKER, WATERMAN, MONT BLANC, FISHER, SCHAEFER, BIC, SCRIPTO and PENTEL. While not shown in FIG. 3, it will be obvious to one of ordinary skill in the art that stylus structure 300 will have a joining system such as a screw fasten (i.e., threaded) system inside of upper barrel member 304 to mount lower barrel member 301 to upper barrel member 304 and secure the stylus cartridge therebetween. Other systems, however, may also be used such as slide top systems where one part of a barrel member slides onto another section of a lower barrel member and like. Also obvious, and shown schematically by double arrow 308 in FIG. 3, is the fact that stylus 300 may incorporate mechanical systems to extend and retract tip 203 out of and into barrel members 301 and 304 respectively. For example, such mechanical systems, shown schematically at 308 can include push button, spring systems, twist slide systems, and/or clip retraction systems that engage with the stylus cartridge 200 in chamber 307. Preferably, such a cartridge retraction system would be similar to one manufactured by MONT BLANC its MEISTERSTUCK line of reusable writing implements.

The ability for a disposable stylus cartridge to be used with existing reusable writing structures such as those discussed above, illustrates an important aspect of the present invention. That is, a pen company need not re-tool its existing and well-selling pens and writing implements to incorporate a disposable stylus cartridge similar in design and structure to disposable stylus cartridge 200.

In operation, stylus 300 is used by first causing tip 203 of disposable stylus cartridge 200 to extend beyond the end of stylus 300. Thereafter, stylus 300 may be used as any other wireless stylus until such time as an intended use is complete. Upon completion, a user of stylus 300 can cause tip 203 to become retracted, thereby allowing stylus 300 to be stored in a shirt pocket, for example, without tip 203 being extended. It should be understood, however, that since tip 203 is formed and constructed to leave no discernable marks as there is no ink or residue carrying member incorporated into disposable stylus cartridge 200, there is no absolute need for tip 203 to be retracted before insertion into one's clothing, for example.

Referring now to FIG. 4 therein depicted is disposable stylus cartridge according to an alternative embodiment of the present invention. The discussions regarding the materials and techniques used to form disposable stylus cartridge 200 apply here with equal force. The differences between disposable stylus cartridge 400 and disposable stylus cartridge 200 are as follows. First, disposable stylus cartridge 400 is designed to be inserted into an open end of a stylus such as an open end of end portion 302 of the writing instrument barrel or stylus 300 (FIG. 3), whereas disposable stylus cartridge 200 is meant to be inserted into an open end of a lower barrel portion when the barrel portion is removed or disengaged from an upper barrel portion of a stylus. This difference allows for a stylus such as stylus 300, to be made without the use or implementation of mechanical systems to move a disposable cartridge up and down axially in a barrel structure. That is, disposable stylus cartridge 400 can be removably inserted into an open end of a barrel portion which is otherwise hollow, thereby reducing the cost of manufacture of a stylus structure.

Stylus cartridge 200 and tip 400 are passive, advantageously simple one piece members. "Possible" is meant to mean no moving parts, no ink or lead and no electrical parts.

A second difference between disposable stylus cartridge 200 and disposable stylus cartridge 400 is the use of a securing structure such as securing structure 402. Securing structure 402 is shown as being a screw type (i.e., threaded) structure which can be releasably inserted into a corresponding threaded socket structure of a barrel structure of a reusable stylus. It is important to note however, that the invention is not limited to a screw type or threaded structure, but may utilize any other securing structure such as male/female protrusion/impression combinations, oversized combinations and permanent arrangements which utilize glues and/or other removable adhesive systems.

In operation, tip 403 functions as tip 203 with the exception that tip 403 is not meant to be mechanically retracted into a stylus barrel.

Having now fully described the present invention in regard to the drawing figures, it should be understood by those skilled in the art that many changes and modifications may be made to the particular design details and arrangements discussed above without departing from the spirit or scope of the present invention as defined in pending claims.

What is claimed is:

1. A wireless stylus apparatus for use with a pen computing device, said pen computing device having an input tablet used for input of information to said pen computing device, said input tablet having a surface, said surface being contacted with said stylus, said surface having a first hardness, said wireless stylus apparatus comprising:

a reusable writing instrument barrel having an open end and a hollow chamber communicating with the open end and adapted to receive a refill writing cartridge having a shape and size;

a passive disposable stylus cartridge having a body section and a head section, said head section having a point, said information being input to said pen computing device when said point is in contact with said surface of said input tablet, said disposable stylus cartridge having the same shape and size as the refill writing cartridge and being releasably mounted in said reusable barrel so that said head section can extend beyond said open end of said reusable barrel, said passive disposable stylus cartridge being configured to leave no discernable mark on said surface of said input tablet when said head section of said disposable stylus cartridge is in contact with said surface of said input tablet, said head section having a second hardness, said disposable stylus cartridge being configured to be disposed of when said information cannot be accurately input to said pen computing device as a result of said tip being worn; and wherein the relationship between said first hardness and said second hardness is such that said head section will not damage said surface of said input tablet.

2. The apparatus according to claim 1 wherein said barrel further comprises securing means for releasably securing said stylus cartridge in said hollow chamber.

3. The apparatus according to claim 2, wherein said barrel comprises a lower barrel member containing at least part of the hollow chamber, and an upper barrel member releasably connected to the lower barrel member and containing at least a portion of the hollow chamber, a pocket clip connected to the upper barrel, said barrel members being connected to each other for securing the passive stylus cartridge therebetween.

4. The apparatus according to claim 3, including a mechanical system in the barrel for extending and retracting the head section through the open end of the barrel.

5. The apparatus according to claim 3 wherein the stylus cartridge is a single piece of material selected from the group consisting of plastic, rubber and wood.

6. The apparatus according to claim 1 wherein said disposable stylus cartridge is formed from plastic.

7. The apparatus according to claim 1 wherein said disposable stylus cartridge is formed from a suitably hard rubber.

8. The apparatus according to claim 1 wherein said disposable stylus cartridge is formed from wood.

9. The apparatus according to claim 1 wherein disposable stylus cartridge is solid and is formed to have a conical shape.

10. The stylus according to claim 1 wherein said disposable stylus cartridge is injection molded.

11. A wireless stylus apparatus and tip member combination, the tip member being adapted to be releasably mounted in a carrier of the apparatus and adapted to be used to input information into a pen computing device, said pen computing device having a contact input tablet, said contact input tablet having a surface, said surface being contacted with said tip member, said surface having a first hardness the combination comprising:

said carrier having a hollow chamber with an end portion, said end portion opening at an end section of said hollow chamber, said hollow chamber having a shape and size for receiving a refill writing cartridge and having first means for releasably securing said tip member when said tip member is mounted in said carrier, said carrier having a clip disposed thereon, said clip releasably securing said carrier to an article of clothing, said tip member being passive and comprising a head section of conical shape and a shaft section integrally formed with said head section, said shaft section having second means for releasably securing said tip member in said carrier device.

12. The combination according to claim 11 wherein said first means comprises a female impression and said second means comprises a male protrusion, said female impression formed to be operationally compatible with said male protrusion.

13. The combination according to claim 11, wherein said tip member is formed of a material selected from the group consisting of plastic, hard rubber and wood.

14. The combination according to claim 13 wherein said head section is solid and is formed to have a conical shape.

15. A disposable passive stylus cartridge adapted to replace a refill writing cartridge having a shape and size and used with a reusable writing device, the reusable writing device having a barrel which includes a hollow chamber adapted to receive and secure the writing cartridge and an open end communicating with the hollow chamber, said disposable passive stylus cartridge configured to input information into a pen computing device which includes an input screen, said disposable passive stylus cartridge comprising:

a passive body section; and a passive head section integrally formed with said body section, said head section having a point, the information being input to the pen computing device when said point is placed into contact with the input screen of the pen computing device, said disposable stylus cartridge corresponding in shape and size to the writing cartridge and being releasably mounted in the reusable barrel so that said head section of said disposable stylus cartridge extends beyond the open end of the barrel, when said disposable stylus cartridges is placed into use, said disposable stylus cartridge being configured to leave no discernable mark on the input screen when said point of said head section of said disposable stylus cartridge is in contact therewith, said disposable stylus cartridge being configured to wear with use.

16. The disposable stylus cartridge according to claim 15 wherein said disposable stylus cartridge is formed from plastic.

17. The disposable stylus cartridge according to claim 15 wherein said head section is conical in shape and wherein said point is rounded so as not to cause damage to the input screen of the pen computing device.

18. Disposable stylus cartridge according to claim 15, wherein the head section includes a writing tip and a small diameter body portion connected to the writing tip, said body section comprising a large diameter body portion connected to the small diameter body portion, the small and large diameter body portions and the writing tip being made of a single piece of plastic material and corresponding in shape and size to a refill writing cartridge adapted to be received and secured in the hollow chamber of the barrel of a reusable writing device.

* * * * *